Oct. 6, 1970     J. C. DEAN     3,532,302

TAIL ROTOR BIASING DEVICE

Filed April 28, 1969     2 Sheets-Sheet 1

INVENTOR
JAMES C. DEAN
BY Maurice B. Tasker
ATTORNEY

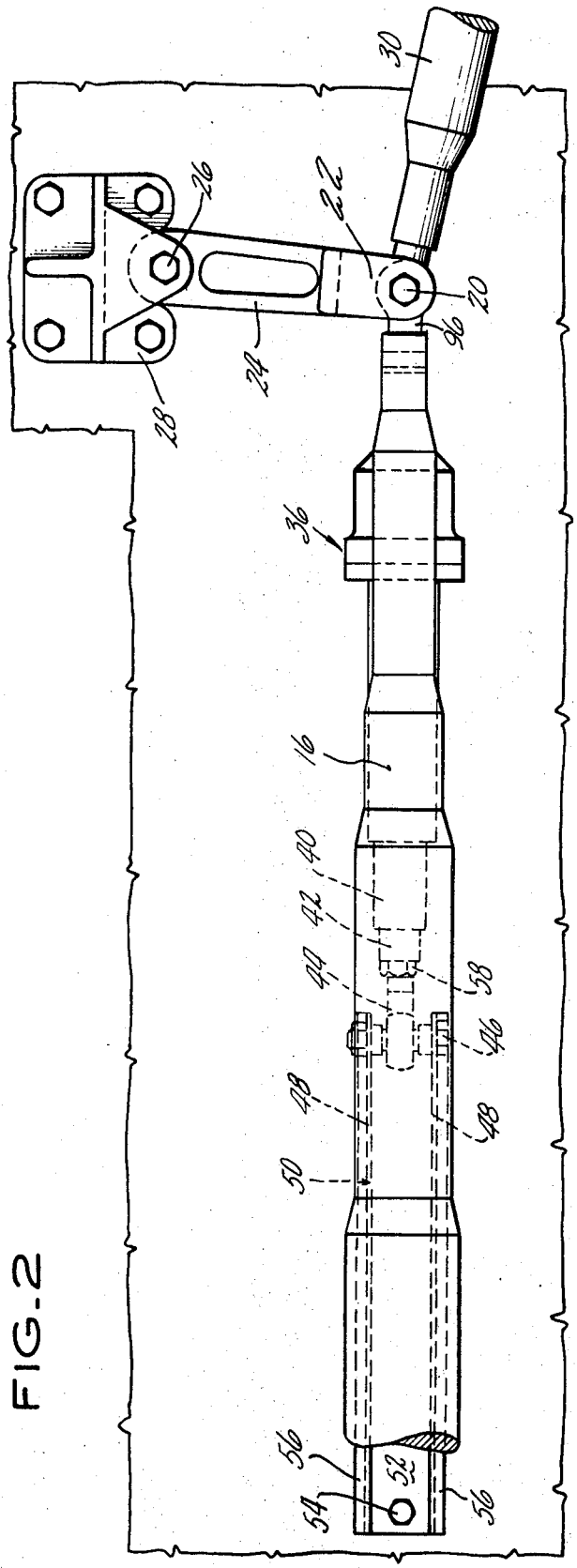
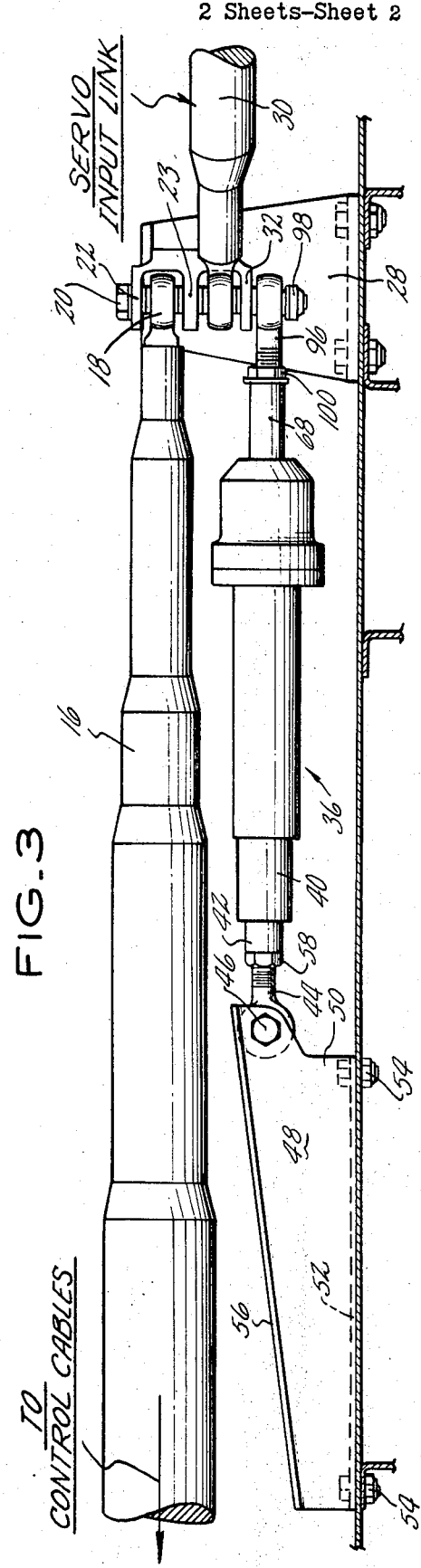
FIG.2
FIG.3

United States Patent Office 3,532,302
Patented Oct. 6, 1970

3,532,302
TAIL ROTOR BIASING DEVICE
James Clement Dean, Stratford, Conn., assignor to United Aircraft Corporation, East Hartford, Conn., a corporation of Delaware
Filed Apr. 28, 1969, Ser. No. 819,578
Int. Cl. B64c 27/78
U.S. Cl. 244—17.19                                10 Claims

ABSTRACT OF THE DISCLOSURE

An anti-torque tail rotor for a rotary wing aircraft has variable pitch blades providing directional (yaw) control of the aircraft. Control linkage from the pilot compartment extends aft to the tail rotor pylon and is operatively connected to the input link of the tail rotor pitch control servocylinder. A spring loaded actuator operatively connected with the main pitch control linkage is preset to have a zero load on the linkage at a position corresponding to a desired positive pitch setting of the blades to provide directional control of the aircraft upon failure of the main linkage.

BACKGROUND OF THE INVENTION

This invention relates to tail rotor pitch control systems for rotary wing aircraft in which variation in the pitch of the tail rotor is used to provide both anti-torque control as well as yaw control of the aircraft. The control linkage from the pilot compartment to the tail rotor pylon may consist of cables or push-pull rods. Usually a combination of both of these is used. In order to insure reliability of operation and especially in military aircraft, which is frequently under fire, it has been usual to provide a redundant linkage system. This results in increased weight and an increasily complex control system. The present invention eliminates the need for a redundant cable system and provides in its place a spring loaded actuator which assumes control of the tail rotor pitch in the event of failure of the main control linkage and provides the pilot with ample flight capability to enable him to return to his base.

FIELD OF THE INVENTION

The present invention is well adapted for utilization with rotary wing aircraft of the general character disclosed in U.S. Pat. 3,199,601 which issued Aug. 10, 1965, to J. C. Dean et al.

DESCRIPTION OF THE PRIOR ART

It has been known previous to this invention to use biasing devices, such as the cam mechanism of Pat. 3,129,769, issued Apr. 21, 1964, to C. E. Hofbauer et al., to bring helicopter main rotor blades into neutral position upon failure of their control mechanisms. Pat. No. 3,135,334, issued June 22, 1964 to I. H. Culver shows another example of the use of springs to bias the blades of a main rotor to zero pitch whenever the blades are not rotating or are rotating very slowly. Neither of these devices, however, will enable a helicopter to continue to fly if its tail rotor pitch control linkage has been severed while in flight.

SUMMARY OF THE INVENTION

The present invention is directed to an improved pitch control system for the aft rotor of a rotary wing aircraft wherein the pitch of the tail rotor is varied to provide anti-torque control and also to provide directional control in yaw. The pitch of the aft rotor blades may be controlled mechanically or hydraulically by a servocylinder. In either case the control linkage from the pilot compartment actuates the pitch control member of the tail rotor. In the illustrative example a hydraulic servocylinder is employed to vary the pitch of the blades.

In accordance with the present invention a spring loaded actuator is operatively connected with the main control linkage originating in the pilot compartment. The actuator is preset to exert a zero force on the linkage at a position corresponding to a desired positive pitch setting of the tail rotor blades to provide directional control to the aircraft if the main control linkage fails, for example, from separation by reason of enemy fire.

It is therefore an object of this invention to provide improved means for maintaining flight control of the aircraft by the pilot in the event of failure of the main pitch control linkage for the tail rotor.

A further object of this invention is to provide this flight capability without the excessive weight penalty and the complexity of a redundant main control linkage.

Other objects and advantages and novel features of the invention will become apparent from the following detailed description of the invention when considered in conjunction with the accompanying drawings.

BRIEF DESCRIPTION OF THE DRAWINGS

FIG. 2 is an enlarged view taken on line 2—2 of FIG. 1;

FIG. 3 is a side view of FIG. 2; and

DESCRIPTION OF THE PREFERRED EMBODIMENT

Figure 1:
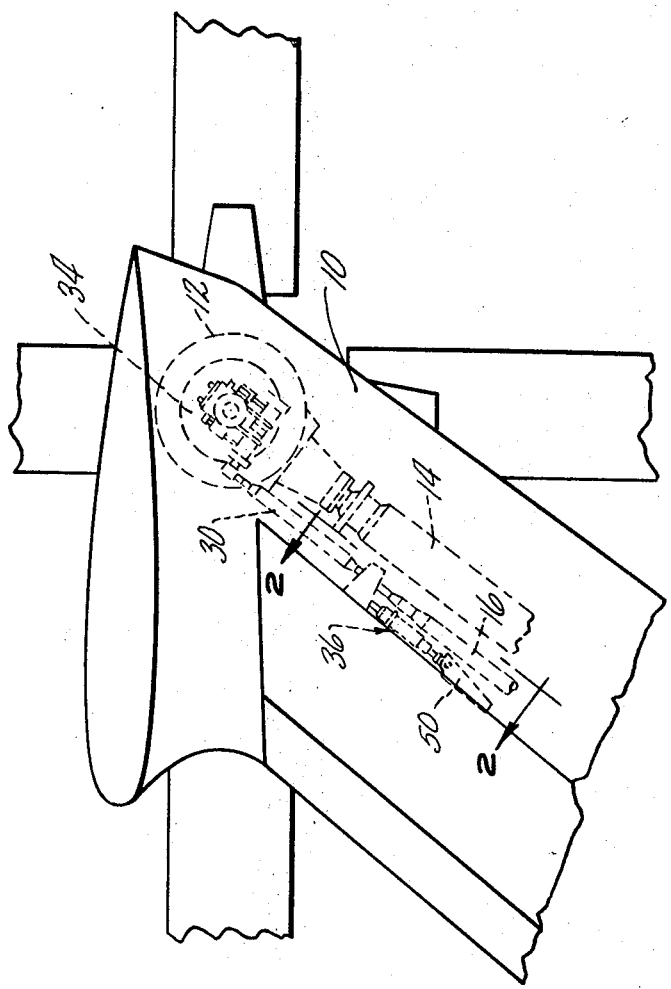
FIG. 1 is a side elevation of a portion of the tail rotor pylon of a single-lift-rotor helicopter, showing the improved control device for the pitch changing servocylinder.

Referring now to the drawings, FIG. 1 shows the upper end of the tail rotor pylon 10 of a single-lift-rotor helicopter including the right angle gear box 12. The tail rotor, which lies on the far side of the pylon is shown with parts broken away. A helicopter of this general type is shown and fully described in the U.S. Pat. No. 3,199,601 of J. C. Dean et al. previously referred to. In this patent the pitch control rod of the tail rotor is actuated mechanically, whereas in the helicopter shown herein the control rod is actuated by a hydraulic servocylinder. Otherwise the main control systems for varying tail rotor pitch are the same. The tail rotor drive shaft is shown at 14 and one link of the main tail rotor pitch changing linkage which connects to the forward control cables actuated by the pilot is shown at 16 (FIGS. 2 and 3). The aft end of link 16 has an eye 18 which is pivoted on an elongated pivot pin 20 in the form of a bolt. Eye 18 is mounted between furcations 22, 23 in the end of a pendulum link 24 which is pivoted at its other end at 26 on a bracket 28 carried by fixed structure of the pylon frame. The servo input link 30 has an eye at its forward end which is also pivoted on bolt 20 between furcations 23 and 32 on link 24. As shown in FIG. 1 the input link 30 is connected at its aft end to the valve of the servocylinder generally indicated at 34.

Figure 4:
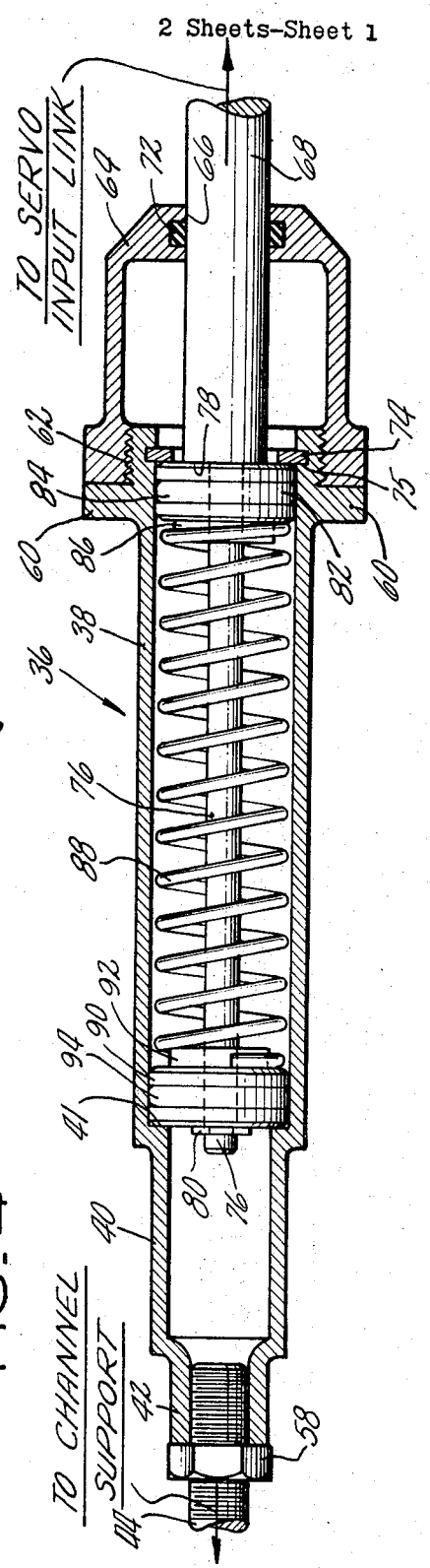
FIG. 4 is an enlarged sectional view of the spring loaded actuator, according to the preferred embodiment of this invention.

In accordance with this invention, a spring loaded actuator generally indicated at 36 is provided in parallel with the main pitch control link 16 in proximity to the tail rotor servo input link 30, as shown most clearly in FIG. 3. Actuator 36, as shown in section in FIG. 4, includes a hollow cylinder 38 of uniform diameter throughout most of its length. Adjacent its forward end it has a reduced portion 40 forming an internal shoulder 41 and at its forward extremity has a further reduced portion 42 which is internally threaded to receive an eyebolt 44. The latter is fixed to the pylon structure by a bolt 46 which extends through the parallel sides 48 of a channel-shaped member 50, the base 52 of which is secured to fixed frame structure of the pylon by bolts 54. Member 50 is of relatively light sheet metal and has stiffening flanges 56 along the edges of its sides 48. The position of cylinder 38 can be adjusted relative to supporting member 50 by turning eyebolt 44 into the threaded portion 42 of the cylinder. A lock nut 58 is provided to secure the eyebolt to the cylinder in adjusted position.

Cylinder 38 is formed with an exterior flange 60 adjacent its aft end and the cylinder is externally threaded at 62 aft of flange 60 to receive a threaded cap 64, the rim of which, when it is threaded onto the cylinder, abuts flange 60. Cap 64 has an axial passage 66 through which a directional control rod 68 is freely reciprocable, an annular groove 70 being provided in the passage to receive a scraper ring 72. The purpose of the ring 72 is to wipe rod 68 and prevent dust from entering the cylinder.

Cylinder 38 also has an internal annular groove adjacent its aft end at about the middle of threaded portion 62 to receive a snap ring 74, the left-hand face of which forms an internal shoulder 75 at this end of the cylinder equivalent in function to abutment, or shoulder, 41 at the forward end of the cylinder.

Rod 68 has a reduced end portion 76 forming a shoulder 78 which normally lies in the same plane as the left-hand side of snap ring 74. Near its forward extremity portion 76 is provided with a snap ring 80 and between this ring and shoulder 78 a plurality of freely slidable members are mounted on portion 76 of rod 68.

Adjacent shoulder 78 and normally abutting it is a disc in the form of a spool 82 carrying an O-ring seal 84 and having an integral spring-centering boss 86, a helical compression spring 88, and a second disc in the form of a spool 90 having a spring-centering boss 92 and O-ring seal 94. Member 90 normally abuts snap ring 80 on rod 68. When there is no pilot force exerted on the main control rod 16, the parts will remain in the FIG. 4 position. The O-ring seals 84 and 94 are provided to prevent dust from getting into the cylinder chamber and to provide damping to prevent spring bounce during rapid control inputs.

An eyebolt 96 is adjustably screw-threaded into the aft end of directional control rod 68 and its eye is pivoted on an end of bolt 20 which is extended beyond furcation 32. A nut 98 holds bolt 20 in place. A clamping nut 100 on eyebolt 96 secures rod 68 against rotation relative to eyebolt 96.

It will be noted that the space between abutment 78 and snap ring 80 on rod 68 is equal to the space between the abutments 75 and 41 on cylinder 38, the length of the spring 88 being so chosen that it has to be only slightly compressed in order to permit snap ring 74 to be placed in its groove. This initial compression of spring 88 in the illustrative example provides an initial spring force of about 20 pounds.

In the use of spring loaded actuator 36 the main tail rotor pitch control rod 16 is actuated to bring the tail rotor pitch to +9°. Eyebolts 96 and 44 are then adjusted relative to the rod and the cylinder respectively to bring the parts into the FIG. 4 position in which the pivot bolts 46 and 20 can be inserted through the eyes of these bolts.

It will be evident that movement of the main control rod 16 to the right (FIG. 3) will result in movement of rod 68 of spring actuator 36 to the right, spring 88 being further compressed during this movement by snap ring 80. Similarly, movement of main control rod 16 to the left from the FIG. 4 position will result in a like movement of rod 68, the shoulder 78 causing spring 88 to be compressed in the opposite direction. These movements of the main pitch control system take place without hindrance from spring actuator 36. In the event of a failure of the main pitch control rod 16 or the cable system which actuates it, spring 88 will immediately return to its centered position shown in FIG. 4 in which the tail rotor pitch is in its +9° position. This positive 9° value is an arbitrary one selected after considering numerous factors to give the best flight capability under all conditions which may be encountered. With this fixed tail rotor pitch setting the pilot has adequate anti-torque force and, by varying his throttle setting, sufficient directional control in yaw to enable him to maintain heading.

I claim:

1. In a rotary wing aircraft, a control linkage for effecting changes in tail rotor blade pitch in response to movement of a pilot operated member including a control rod located in proximity to the tail rotor, and means operatively connected with said control rod for actuating the tail rotor blades to a preselected positive pitch setting upon severance of said control linkage.

2. The combination of claim 1 in which the means for actuating the tail rotor blades upon severance of said control linkage comprises a spring actuator in which the actuator imposes a zero force on said control rod at the preselected positive pitch setting of the tail rotor blades.

3. In a rotary wing aircraft, a control linkage for effecting changes in tail rotor blade pitch in response to movement of a pilot operated control member including a control rod located in proximity to the tail rotor, and a spring actuator operatively connected to said control linkage which imposes a zero force on said control linkage in a position of the latter corresponding to a preselected positive pitch setting of the blades.

4. The combination of claim 3 in which the spring actuator includes a hollow cylinder carried by fixed aircraft structure having internal abutments at its opposite ends, a helical compression spring in said cylinder between said abutments, and a direction control rod operatively connected to the control linkage and extended into said cylinder and through said spring having spaced abutments, one located at either end of said spring in position to oppositely compress the latter upon axial movements of said direction control rod in opposite directions.

5. In a rotary wing aircraft, a control linkage for effecting changes in tail rotor blade pitch in response to movement of a pilot operated control member including a control rod having its aft end connected to the input link of the tail rotor blade pitch control mechanism, and a spring loaded actuator including a hollow cylinder and a direction control rod extended into the cylinder, said direction control rod being in parallel with the control rod of said control linkage and having its aft end connected to said input link and having its forward end acted upon by said spring, said spring imposing a zero force on said input link when said control linkage is in a position to correspond to a preselected positive blade pitch setting of the tail rotor.

6. The combination of claim 5 in which the spring loaded actuator has two internal abutments one adjacent each end of the cylinder, two discs slidable on the direction control rod, one at each end of said cylinder, a helical compression spring on said direction control rod between said discs urging the latter toward said cylinder abutments, and two shoulders on said direction control rod normally engaging said discs on the remote faces thereof when said control linkage is in a predetermined positive blade pitch position.

7. The combination of claim 6 in which the cylinder is adjustably connected to fixed aircraft structure at its forward end.

8. In a rotary wing aircraft, a control linkage for effecting changes in tail rotor blade pitch in response to movement of a pilot operated control member including a push-pull control rod located in proximity to the tail rotor, and a spring loaded actuator operatively connected at its aft end to said control linkage in parallel with said rod including a helical compression spring which is compressed by movements of said control rod in either of its push or pull direction of movement, said actuator having a connection at its forward end to fixed aircraft structure, and means for adjusting the position of said actuator relative to said control rod so that said spring imposes a zero force on said control rod when said linkage is in a position corresponding to a predetermined positive pitch setting of the rotor blades.

9. In a rotary wing aircraft, a control linkage for effecting changes in tail rotor blade pitch in response to movement of a pilot operated control member including a control rod located in proximity to the tail rotor, and means operatively connected with said rod for actuating the tail rotor blades to a preselected positive pitch setting upon severance of said control linkage including a spring actuator, said actuator comprising cooperating relatively reciprocable cylinder and piston elements, said cylinder element having spaced internal shoulders and said piston element including a direction control rod extended into the cylinder and having an intermediate compression spring and two spool-like members freely slidable on said direction control rod and urged by said spring to seat on said cylinder abutments, two abutments on said direction control rod engaging the remote faces of said spool-like members, and means external of said cylinder element for connecting one of said cooperating elements to fixed aircraft structure and for connecting the other of said elements to said control linkage.

10. The combination of claim 9 in which means is provided for adjusting the axial position of said actuator relative to fixed aircraft structure.

References Cited
UNITED STATES PATENTS

| | | | |
|---|---|---|---|
| 3,000,445 | 9/1961 | Stuart | 416—123 XR |
| 3,135,334 | 6/1964 | Culver | 244—17.13 XR |

MILTON BUCHLER, Primary Examiner

P. E. SAUBERER, Assistant Examiner

U.S. Cl. X.R.

416—123